United States Patent
Vail et al.

(10) Patent No.: US 9,453,270 B1
(45) Date of Patent: Sep. 27, 2016

(54) METHODS OF FABRICATING A POLYCRYSTALLINE DIAMOND COMPACT

(71) Applicant: US SYNTHETIC CORPORATION, Orem, UT (US)

(72) Inventors: Michael A. Vail, Genola, UT (US); Kenneth E. Bertagnolli, Riverton, UT (US)

(73) Assignee: US SYNTHETIC CORPORATION, Orem, UT (US)

( * ) Notice: Subject to any disclaimer, the term of this patent is extended or adjusted under 35 U.S.C. 154(b) by 121 days.

(21) Appl. No.: 14/332,126

(22) Filed: Jul. 15, 2014

Related U.S. Application Data (63) Continuation of application No. 12/917,150, filed on Nov. 1, 2010, now Pat. No. 8,813,878, which is a continuation of application No. 12/120,849, filed on May 15, 2008, now Pat. No. 7,845,438.

(51) Int. Cl.
*E21B 10/46* (2006.01)
*C22C 26/00* (2006.01)

(52) U.S. Cl.
CPC ............ *C22C 26/00* (2013.01); *B22F 2998/10* (2013.01); *C22C 2026/006* (2013.01)

(58) Field of Classification Search
CPC ................................ E21B 10/46; E21B 10/56
USPC .................................................. 175/433, 434
See application file for complete search history.

(56) References Cited

U.S. PATENT DOCUMENTS

| | | |
|---|---|---|
| 4,040,849 A | 8/1977 | Greskovich |
| 4,268,276 A | 5/1981 | Bovenkerk |
| 4,274,900 A | 6/1981 | Mueller et al. |
| 4,410,054 A | 10/1983 | Nagel et al. |
| 4,468,138 A | 8/1984 | Nagel |
| 4,560,014 A | 12/1985 | Geczy |
| 4,608,226 A | 8/1986 | Lauvinerie et al. |
| 4,738,322 A | 4/1988 | Hall et al. |
| 4,797,326 A | 1/1989 | Csillag |
| 4,811,801 A | 3/1989 | Salesky et al. |
| 4,913,247 A | 4/1990 | Jones |
| 4,943,488 A | 7/1990 | Sung et al. |
| 5,016,718 A | 5/1991 | Tandberg |
| 5,092,687 A | 3/1992 | Hall |
| 5,120,327 A | 6/1992 | Dennis |
| 5,127,923 A | 7/1992 | Bunting et al. |

(Continued)

OTHER PUBLICATIONS

U.S. Appl. No. 62/062,489, filed Oct. 10, 2014, Kidd et al.

(Continued)

*Primary Examiner* — Kenneth L Thompson
(74) *Attorney, Agent, or Firm* — Dorsey & Whitney LLP (57) ABSTRACT

Embodiments relate to PDCs, methods of fabricating PDCs, and applications for such PDCs. In an embodiment, a PDC includes a substrate and a pre-sintered PCD table including an interfacial surface that is bonded to the substrate. The pre-sintered PCD table may be substantially free of leaching by-products in a region at least proximate to the interfacial surface. In an embodiment, a method of fabricating a PDC includes providing an at least partially leached PCD including an interfacial surface. The method includes removing at least some leaching by-products from the at least partially leached PCD table. After removing the at least some leaching by-products, the method includes bonding the interfacial surface of the at least partially leached PCD table to a substrate to form a PDC.

21 Claims, 10 Drawing Sheets

(56) References Cited

U.S. PATENT DOCUMENTS

| | | |
|---|---|---|
| 5,135,061 A | 8/1992 | Newton |
| 5,154,245 A | 10/1992 | Waldenstrom et al. |
| 5,364,192 A | 11/1994 | Damm et al. |
| 5,368,398 A | 11/1994 | Damm et al. |
| 5,460,233 A | 10/1995 | Meany et al. |
| 5,480,233 A | 1/1996 | Cunningham |
| 5,544,713 A | 8/1996 | Dennis |
| 6,793,681 B1 | 9/2004 | Pope et al. |
| 7,712,553 B2 | 5/2010 | Shamburger |
| 7,845,438 B1 | 12/2010 | Vail et al. |
| 7,866,418 B2 | 1/2011 | Bertagnolli et al. |
| 8,230,953 B1 | 7/2012 | Vail et al. |
| 8,758,463 B2 | 6/2014 | Cariveau et al. |
| 8,813,878 B1 * | 8/2014 | Vail .................. C22C 26/00 175/426 |
| 2009/0152018 A1 | 6/2009 | Sani |
| 2010/0095602 A1 | 4/2010 | Belnap et al. |
| 2011/0030283 A1 | 2/2011 | Cariveau et al. |

OTHER PUBLICATIONS

U.S. Appl. No. 14/876,516, filed Oct. 6, 2015, Kidd et al.
U.S. Appl. No. 12/917,150, filed Aug. 6, 2014, Issue Notification.
U.S. Appl. No. 12/917,150, filed Nov. 1, 2010, Vail et al.
U.S. Appl. No. 12/120,849, filed Dec. 28, 2009, Office Action.
U.S. Appl. No. 12/120,849, filed Mar. 17, 2010, Office Action.
U.S. Appl. No. 12/120,849, filed Aug. 19, 2010, Notice of Allowance.
U.S. Appl. No. 12/120,849, filed Nov. 17, 2010, Issue Notification.
U.S. Appl. No. 12/917,150, filed Apr. 16, 2014, Notice of Allowance.
U.S. Appl. No. 12/917,188, filed Oct. 27, 2011, Office Action.
U.S. Appl. No. 12/917,188, filed Apr. 9, 2012, Notice of Allowance.
U.S. Appl. No. 12/917,188, filed Jul. 11, 2012, Issue Notification.

* cited by examiner

METHODS OF FABRICATING A POLYCRYSTALLINE DIAMOND COMPACT

CROSS-REFERENCE TO RELATED APPLICATIONS

This application is a continuation of U.S. application Ser. No. 12/917,150 filed on 1 Nov. 2010, issued on 26 Aug. 2014 as U.S. Pat. No. 8,813,878, which is a continuation of U.S. application Ser. No. 12/120,849 filed 15 May 2008, issued on 7 Dec. 2010 as U.S. Pat. No. 7,845,438, the disclosures of each of which are incorporated herein, in their entirety, by reference.

BACKGROUND

Wear-resistant, superabrasive compacts are utilized in a variety of mechanical applications. For example, polycrystalline diamond compacts ("PDCs") are used in drilling tools (e.g., cutting elements, gage trimmers, etc.), machining equipment, bearing apparatuses, wire-drawing machinery, and in other mechanical apparatuses.

PDCs have found particular utility as superabrasive cutting elements in rotary drill bits, such as roller cone drill bits and fixed cutter drill bits. A PDC cutting element typically includes a superabrasive diamond layer (also known as a diamond table). The diamond table is formed and bonded to a substrate using an ultra-high pressure, ultra-high temperature ("HPHT") process. The PDC cutting element may also be brazed directly into a preformed pocket, socket, or other receptacle formed in the bit body. The substrate may be often brazed or otherwise joined to an attachment member, such as a cylindrical backing. A rotary drill bit typically includes a number of PDC cutting elements affixed to the bit body. It is also known that a stud carrying the PDC may be used as a PDC cutting element when mounted to a bit body of a rotary drill bit by press-fitting, brazing, or otherwise securing the stud into a receptacle formed in the bit body.

Conventional PDCs are normally fabricated by placing a cemented-carbide substrate into a container or cartridge with a volume of diamond particles positioned adjacent to a surface of the cemented-carbide substrate. A number of such cartridges may be loaded into a HPHT press. The substrates and volume of diamond particles are then processed under HPHT conditions in the presence of a catalyst material that causes the diamond particles to bond to one another to form a matrix of bonded diamond grains defining a polycrystalline diamond ("PCD") table. The catalyst material is often a metal-solvent catalyst, such as cobalt, nickel, iron, or alloys thereof that is used for promoting intergrowth of the diamond particles.

In one conventional approach for forming a PDC, a constituent of the cemented-carbide substrate, such as cobalt from a cobalt-cemented tungsten carbide substrate, liquefies and sweeps from a region adjacent to the volume of diamond particles into interstitial regions between the diamond particles during the HPHT process. The cobalt acts as a solvent catalyst to promote intergrowth between the diamond particles, which results in formation of bonded diamond grains. A solvent catalyst may be mixed with the diamond particles prior to subjecting the diamond particles and substrate to the HPHT process.

In another conventional approach for forming a PDC, a sintered PCD table may be separately formed and then leached to remove solvent catalyst from interstitial regions between bonded diamond grains. The leached PCD table may be simultaneously HPHT bonded to a substrate and infiltrated with a non-catalyst material, such as silicon, in a separate HPHT process. The silicon may infiltrate the interstitial regions of the sintered PCD table from which the solvent catalyst has been leached and react with the diamond grains to form silicon carbide.

Despite the availability of a number of different PCD materials, manufacturers and users of PCD materials continue to seek PCD materials that exhibit improved toughness, wear resistance, and/or thermal stability.

SUMMARY

Embodiments of the invention relate to PDCs, methods of fabricating PDCs, and applications for such PDCs. In an embodiment, a PDC includes a substrate and a pre-sintered PCD table including an interfacial surface that is bonded to the substrate. The pre-sintered PCD table may be substantially free of leaching by-products in a region at least proximate to the interfacial surface.

In an embodiment, a method of fabricating a PDC includes providing an at least partially leached PCD table including an interfacial surface. The method further includes removing at least some leaching by-products from the at least partially leached PCD table. After removing the at least some leaching by-products, the method further includes bonding the interfacial surface of the at least partially leached PCD table to a substrate to form the PDC.

In an embodiment, a PDC includes a substrate and a PCD table bonded to the substrate. The PCD table includes a leached region that extends to a selected leach depth from a working surface of the PCD table. The leached region is substantially free of catalyst and leaching by-products In an embodiment, a method includes forming a PDC having a PCD table bonded to a substrate. The method further includes leaching catalyst from at least a portion of the PCD table. The method further includes removing at least some leaching by-products generated by the leaching the catalyst from the PCD table.

Other embodiments relate to applications utilizing the disclosed PDCs in various articles and apparatuses, such as rotary drill bits, bearing apparatuses, wire-drawing dies, machining equipment, and other articles and apparatuses.

BRIEF DESCRIPTION OF THE DRAWINGS

The drawings illustrate several embodiments of the invention, wherein identical reference numerals refer to identical elements or features in different views or embodiments shown in the drawings.

DETAILED DESCRIPTION

Embodiments of the invention relate to methods of fabricating a PDC and PDCs so-formed. The PDC embodiments disclosed herein may be used in a variety of applications, such as drilling tools (e.g., compacts, cutting elements, gage trimmers, etc.), machining equipment, bearing apparatuses, wire-drawing dies, and other apparatuses.

Figure 1A:
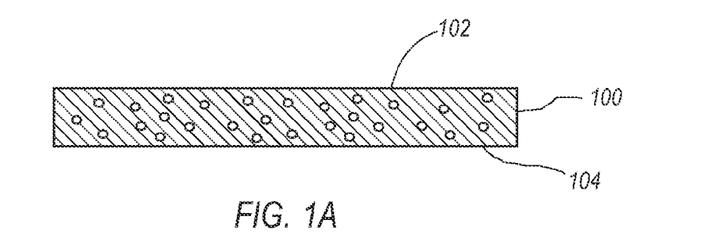
FIGS. 1A-1E are cross-sectional views illustrating a method of fabricating a PDC according to an embodiment.

FIGS. 1A-1E are cross-sectional views illustrating a method of fabricating a PDC according to an embodiment that comprises removing at least some leaching by-products from an at least partially leached PCD table and bonding the at least partially leached PCD table having leaching by-products removed therefrom to a substrate. Such a method may reduce cracking and/or spalling in the at least partially leached PCD table. Referring to FIG. 1A, an at least partially leached PCD table 100 (i.e., a porous, pre-sintered PCD table) including a first surface 102 and an opposing second interfacial surface 104 may be provided. The PCD table 100 includes a plurality of interstitial regions that were previously occupied by a catalyst and form a network of at least partially interconnected pores that extend between the first surface 102 and the second interfacial surface 104.

The at least partially leached PCD table 100 may be fabricated by subjecting a plurality of diamond particles (e.g., diamond particles having an average particle size between 0.5 μm to about 150 μm) to a HPHT sintering process in the presence of a catalyst, such as cobalt, nickel, iron, or an alloy of any of the preceding metals to facilitate intergrowth between the diamond particles and form a PCD table comprising bonded diamond grains defining interstitial regions with the catalyst disposed within the interstitial regions. The as-sintered PCD table may be leached by immersion in an acid, such as aqua-regia, a solution of 90% nitric acid/10% de-ionized water, or subjected to another suitable process to remove at least a portion of the catalyst from the interstitial regions of the polycrystalline diamond table and form the at least partially leached PCD table 100. In one embodiment, the sintered diamond grains of the at least partially leached PCD table 100 may exhibit an average grain size of about 20 μm or less.

As a result of the leaching process used to remove the catalyst, the at least partially leached PCD table 100 may include leaching by-products. For example, the solution used to remove, for example, cobalt from the interstitial regions may leave one or more types of residual salts, one or more types of oxides, combinations of the foregoing, or another leaching by-product within at least some of the interstitial regions of the at least partially leached PCD table 100. For example, depending upon the chemistry of the leaching solution, the leaching by-products may comprise a salt of nitric acid, hydrochloric acid, phosphoric acid, acetic acid, or mixtures of the foregoing. For example, the salt may be cobalt nitrate or cobalt chloride. The leaching by-products may also comprise a metal oxide, such as an oxide of tungsten, cobalt or other metal-solvent catalyst, and/or another type of metal present in the catalyst of the at least partially leached PCD table 100 prior to leaching. It is currently believed that such leaching by-products may block, obstruct, or otherwise inhibit infiltration of the at least partially leached PCD table 100 with a catalyst, such as cobalt, when the at least partially leached PCD table 100 is bonded to a substrate. Additionally, such leaching by-products may inhibit back filling with a non-catalyst material such as silicon.

Figure 1B:
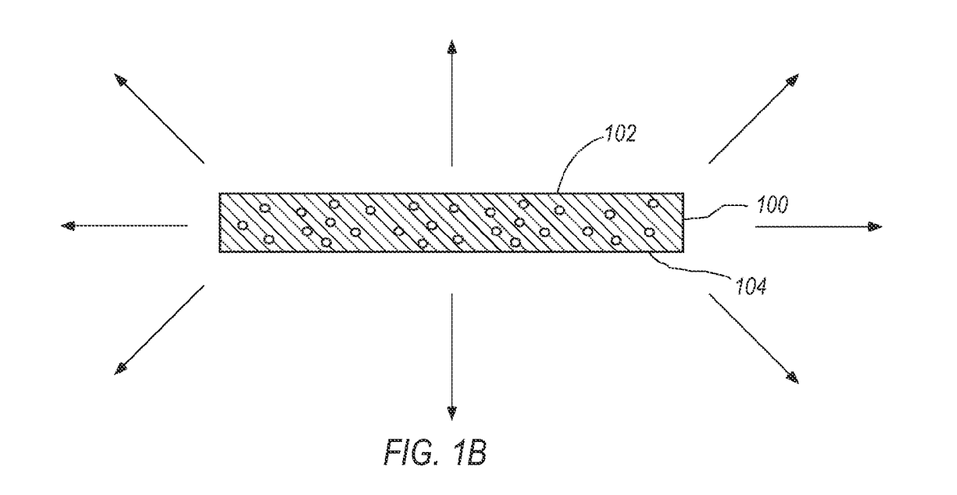

Referring to FIG. 1B, at least some of the leaching by-products may be removed from the at least partially leached PCD table 100. In an embodiment, at least some of the leaching by-products may be removed by subjecting the at least partially leached PCD table 100 to a thermal-cleaning process. In such a thermal process, the at least partially leached PCD table 100 may be heated under partial vacuum (e.g., at a pressure less than ambient atmospheric pressure) to a temperature sufficient to sublimate at least some of the leaching by-products present in the at least partially leached PCD table 100, but below a temperature at which the diamond grains of the at least partially leached PCD table 100 may significantly degrade. For example, the at least partially leached PCD table 100 may be heated in a vacuum furnace at a temperature between at least about 600° Celsius and less than about 700° Celsius for about 0.5 hours to about 2.0 hours or more. In an embodiment, the at least partially leached PCD table 100 may be heated in a vacuum furnace at a temperature of about 650° Celsius for about 1 hour to about 1.5 hours.

In another embodiment, at least some of the leaching by-products may be removed from the at least partially leached PCD table 100 using a chemical cleaning process. For example, the at least partially leached PCD table 100 may be immersed in hydrofluoric acid. The concentration of the hydrofluoric acid and the immersion time of the at least partially leached PCD table 100 in the hydrofluoric acid may be selected so that at least some of the leaching by-products and, in some embodiments, substantially all of the leaching by-products may be removed from the at least partially leached PCD table 100.

In one embodiment of a chemical cleaning process, at least some of the leaching by-products may be removed using an ultrasonic cleaning process. For example, the at least partially leached PCD table 100 may be immersed in a selected solvent and ultrasonic energy applied to the selected solvent for a selected period of time to effect removal of at least some of the leaching by-products and, in some embodiments, substantially all of the leaching by-products may be removed from the at least partially leached PCD table 100. The selected solvent may be an aqueous solution (e.g., hydrofluoric acid) or an organic solvent.

Figure 1C:
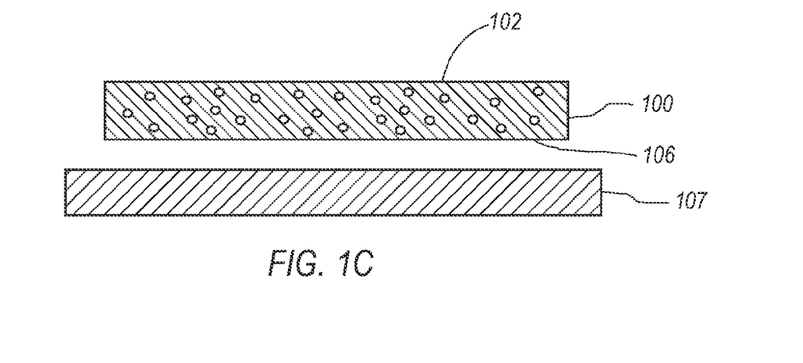

Referring to FIG. 1C, in one embodiment, after removing at least some of the leaching by-products, the second interfacial surface 104 may be substantially planarized to reduce a non-planarity thereof using, for example, a planarizing machine 107, such as a lapping pad, a grinding pad, or other mechanical or chemical-mechanical planarization machine. Substantially planarizing the second interfacial surface 104 of the at least partially leached PCD table 100 by removing material therefrom results in formation of a substantially planarized interfacial surface 106. It is noted that the substantially planarized interfacial surface 106 may or may not include part of the former second interfacial surface 104 depending upon the amount of material removed from the at least partially leached PCD table 100. The substantially planarized interfacial surface 106 may exhibit a flatness of about 0.00050 inch to about 0.0010 inch. In another embodiment, the flatness may be about 0.00050 inch to about 0.0075 inch.

Figure 1D:
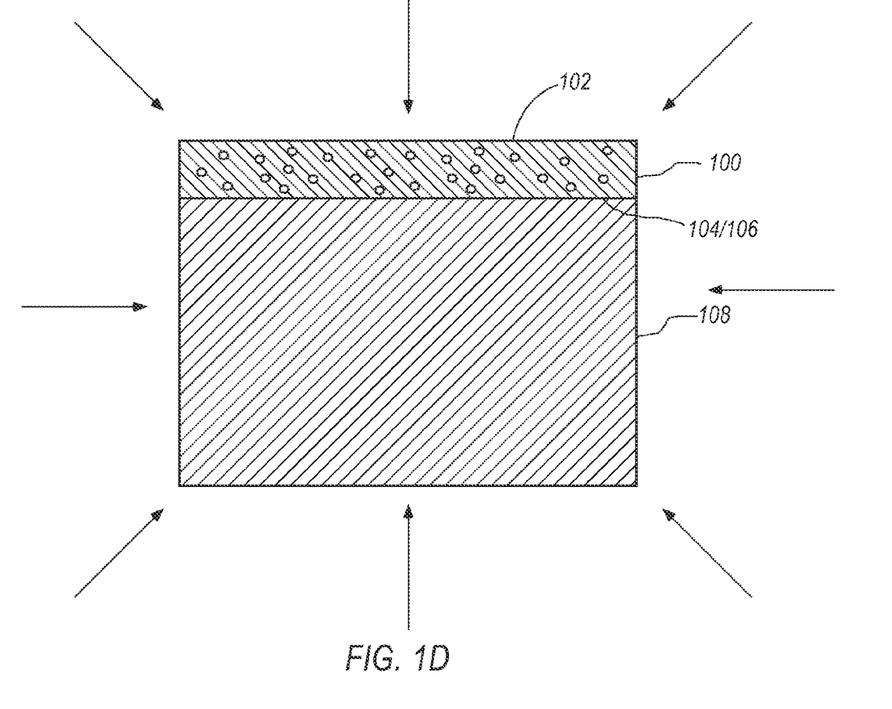

Referring to FIG. 1D, after cleaning, the second interfacial surface 104 (or the substantially planarized interfacial surface 106 when the second interfacial surface 104 is planarized) of the at least partially leached PCD table 100 may be placed at least proximate to a substrate 108. For example, in an embodiment, the second interfacial surface 104 (or the substantially planarized interfacial surface 106) may abut with a surface of the substrate 108. The substrate 108 may comprise a cemented-carbide material, such as a cobalt-cemented tungsten carbide material or another suitable material. For example, nickel, iron, and alloys thereof are other catalysts that may comprise the substrate 108. Other materials that may comprise the substrate 108 include, without limitation, cemented carbides including titanium carbide, niobium carbide, tantalum carbide, vanadium carbide, and combinations of any of the preceding carbides cemented with iron, nickel, cobalt, or alloys thereof.

Figure 1E:
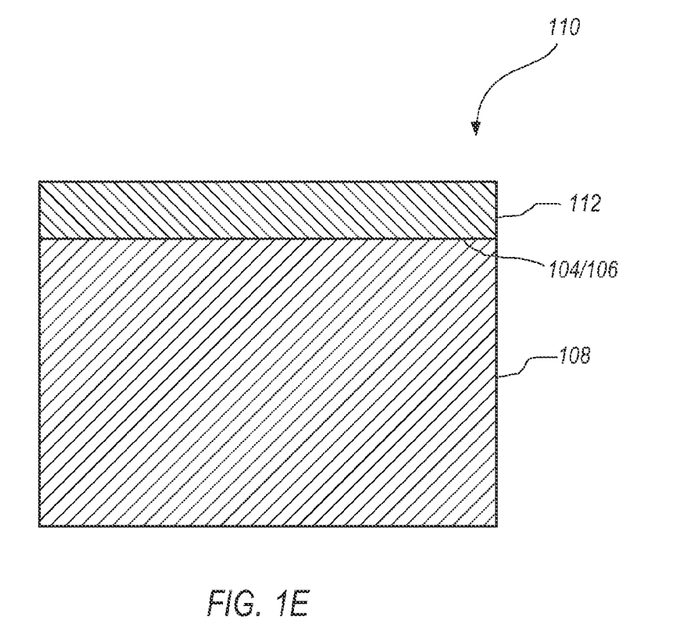
Figure 1F:
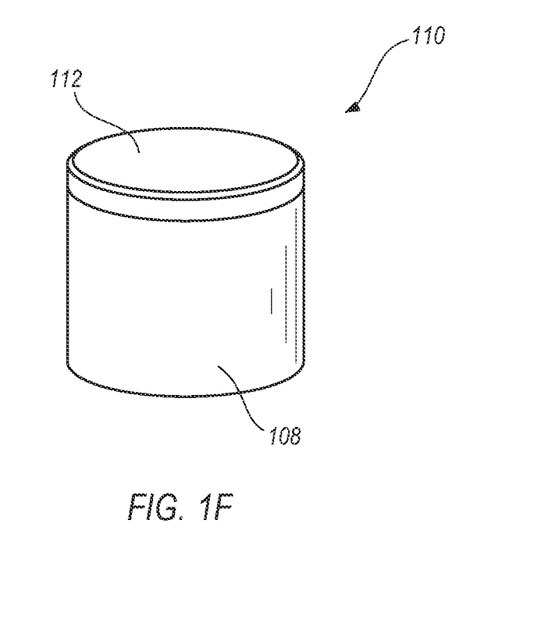
FIG. 1F is an isometric view of the PDC shown in FIG. 1E.

The assembly of the at least partially leached PCD table 100 and substrate 108 may be placed in a pressure transmitting medium, such as a refractory metal can, graphite structure, pyrophyllite or other pressure transmitting structure, or another suitable container or supporting element. The pressure transmitting medium, including the assembly, may be subjected to a HPHT process using a HPHT press at a temperature of at least about 1000° Celsius (e.g., about 1300° Celsius to about 1600° Celsius) and a pressure of at least 40 kilobar (e.g., about 50 kilobar to about 80 kilobar) for a time sufficient to bond the at least partially leached PCD table 100 to the substrate 108 and form a PDC 110 as shown in FIGS. 1E and 1F. The HPHT process bonds the at least partially leached PCD table 100 to the substrate 108 and may cause a catalyst from the substrate 108 or another source to infiltrate the interstitial regions of the at least partially leached PCD table 100. The HPHT temperature may be sufficient to melt at least one constituent of the substrate 108 (e.g., cobalt, nickel, iron, alloys thereof, or another constituent) that infiltrates the substrate 108. The PDC 110 so-formed includes a PCD table 112 in which the interstitial regions thereof are at least partially filled with the catalyst. It is noted that the PDC 110 may exhibit other geometries than the geometry illustrated in FIGS. 1E and 1F. For example, the PDC 110 may exhibit a non-cylindrical geometry.

Because the at least partially leached PCD table 100 was cleaned to remove at least some of the leaching by-products prior to bonding to the substrate 108, the PCD table 112 so-formed may be substantially free of the leaching by-products. In embodiments when the second interfacial surface 104 is substantially planarized as shown in FIG. 1C, because the substantially planarized interfacial surface 106 of the at least partially leached PCD table 100 is substantially planar, the HPHT process used to form the PDC 110 may not introduce tensile bending stresses sufficient to cause cracking, spalling, or cracking and spalling in the PCD table 112 so-formed.

Figure 1G:
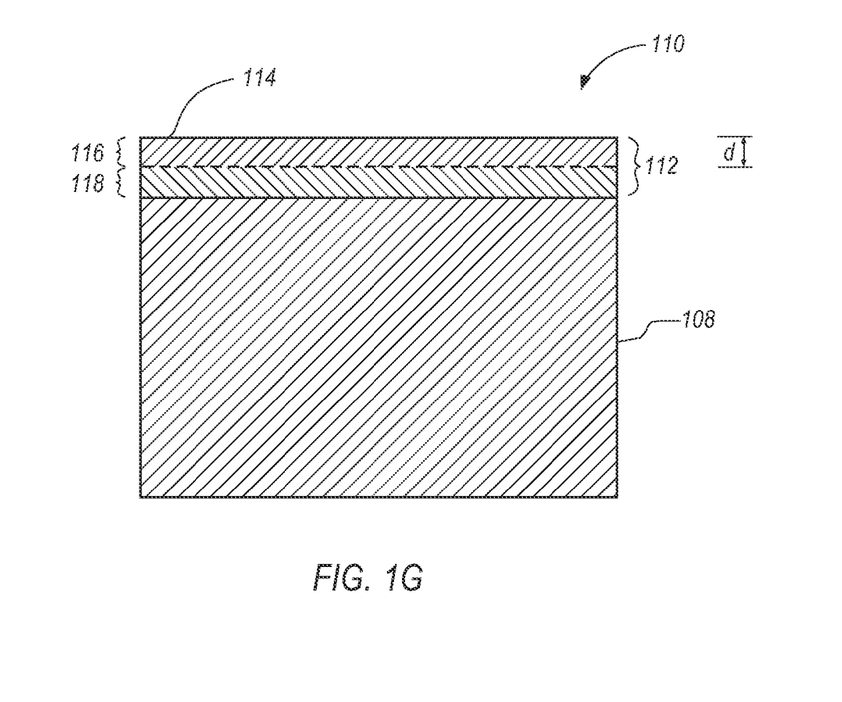
FIG. 1G is a cross-sectional view of the PDC shown in FIGS. 1E and 1F after leaching the PCD table to a selected leach depth according to an embodiment.

Referring to FIG. 1G, in one embodiment, the PCD table 112 of the PDC 110 may be leached to remove the catalyst that forms part of the PCD table 112 to a selected leach depth d measured from a working surface 114. For example, the PCD table 112 may be immersed in an acid, such as aqua-regia, a solution of 90% nitric acid/10% de-ionized water, or another suitable acid to leach the catalyst from the PCD table 112 to form a first volume 116 remote from the substrate 108 that is substantially free of the catalyst, with a second volume 118 proximate to the substrate 108 that is relatively unaffected by the leaching process and includes the catalyst. In an embodiment, the leach depth d that the first volume 116 extends to may be greater than about 200 µm. In another embodiment, the leach depth d may be about 50 µm to about 500 µm. Even after partially leaching the PCD table 112, at least a region of the PCD table 112 proximate to and including the interfacial surface 104 (or the substantially planarized interfacial surface 106) may be substantially free of leaching by-products. In another embodiment, the PCD table 112 may be leached so that the leach depth d may be approximately equal to a thickness of the PCD table 112.

In an embodiment, after leaching the PCD table 112, the PCD table 112 may be cleaned using any of the previously described cleaning processes, such as thermal or chemical cleaning, to remove some or substantially all leaching by-products therefrom. It is currently believed that removing at least some of the leaching by-products from the PCD table 112 may increase the thermal stability of the PCD table 112.

In an embodiment, the at least partially leached PCD table 100 is not formed by sintering the diamond particles on a cemented-tungsten-carbide substrate or otherwise in the presence of tungsten carbide. In such an embodiment, the interstitial regions of the at least partially leached PCD table 100 may contain no tungsten and/or no tungsten carbide or insignificant amounts of tungsten and/or tungsten carbide, which can inhibit removal of the catalyst.

In other embodiments, a PCD table may be formed by HPHT sintering diamond particles in the presence of tungsten carbide. For example, diamond particles may be placed adjacent to a cemented tungsten carbide substrate and/or tungsten carbide particles may be mixed with the diamond particles prior to HPHT sintering. In such an embodiment, the PCD table so-formed may include tungsten and/or tungsten carbide that is swept in with the catalyst from the substrate or intentionally mixed with the diamond particles during HPHT sintering process. For example, some tungsten and/or tungsten carbide from the substrate may be dissolved or otherwise transferred by the liquefied catalyst (e.g., cobalt from a cobalt-cemented tungsten carbide substrate) of the substrate that sweeps into the diamond particles. The PCD table so-formed may be separated from the substrate using a lapping process, a grinding process, wire-electrical-discharge machining ("wire EDM"), or another suitable material-removal process. The separated PCD table may be immersed in a suitable solution (e.g., a hydrochloric acid/hydrogen peroxide solution) to remove substantially all of the catalyst from the interstitial regions and form the at least partially leached PCD table 100. However, an indeterminate amount of tungsten and/or tungsten carbide may still remain distributed throughout the at least partially leached PCD table 100 even after leaching.

Figure 2:
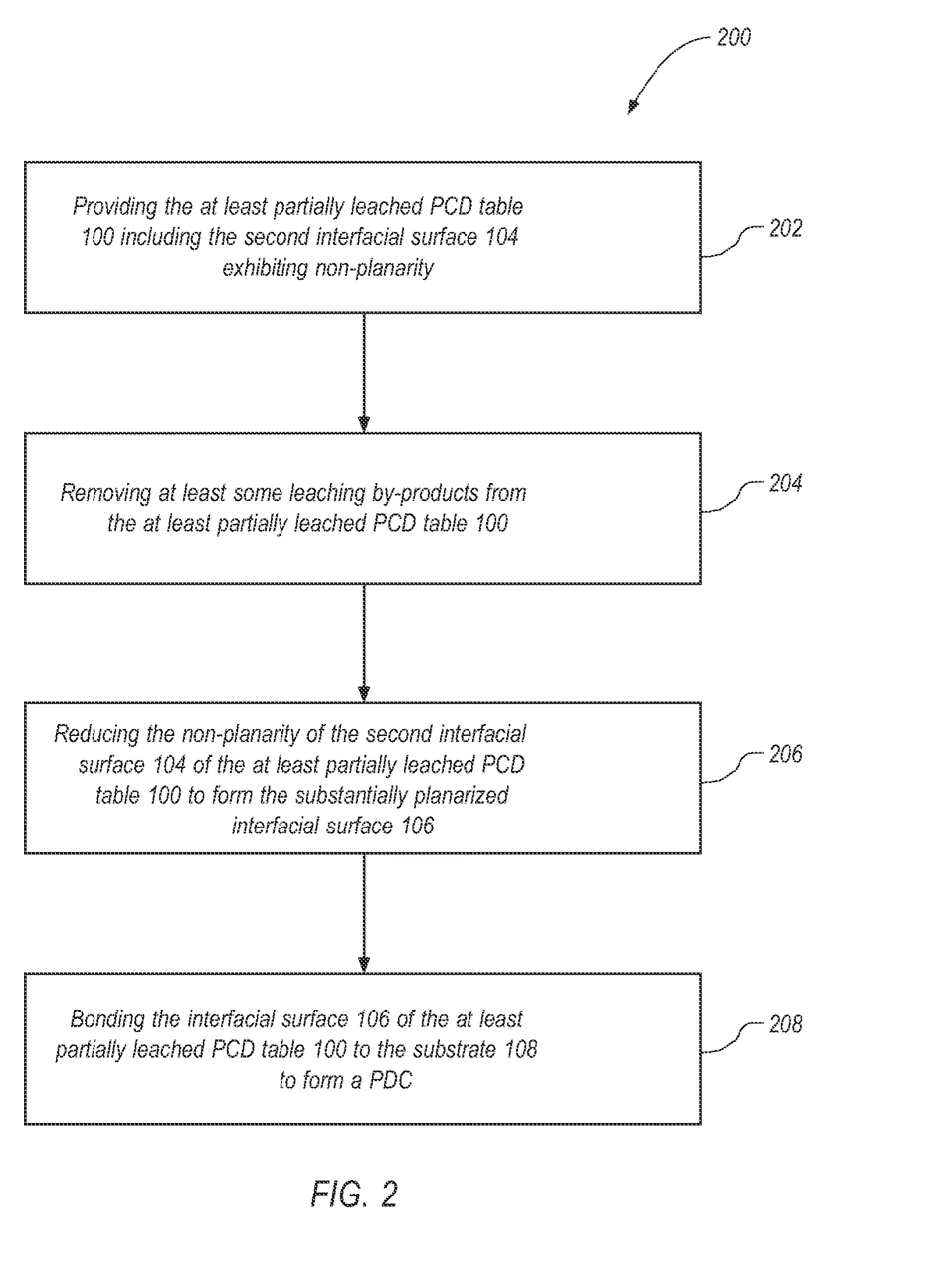
FIG. 2 is a flow diagram of a method of fabricating a PDC according to another embodiment.

Referring to FIG. 2, in another embodiment, the at least partially leached PCD table 100 may be treated to remove at least some of the leaching by-products from the at least partially leached PCD table 100 prior to the second interfacial surface 104 thereof being planarized to form the substantially planarized interfacial surface 106. FIG. 2 is a flow diagram of a method 200 of fabricating a PDC according to another embodiment. In act 202, the at least partially leached PCD table 100 including the second interfacial surface 104 that exhibits non-planarity is provided. In act 204, at least some of the leaching by-products present in the at least partially leached PCD table 100 may be removed via, for example, any of the aforementioned thermal-cleaning or chemical cleaning processes. In act 206, the non-planarity of the second interfacial surface 104 of the at least partially leached PCD table 100 may be reduced by substantially planarizing (e.g., via a lapping or grinding process) the second interfacial surface 104 to form the substantially planarized interfacial surface 106. In act 208, the substantially planarized interfacial surface 106 of the cleaned and planarized at least partially leached PCD table 100 may be bonded to the substrate 108 using the HPHT process to form a PDC.

Figure 3A:
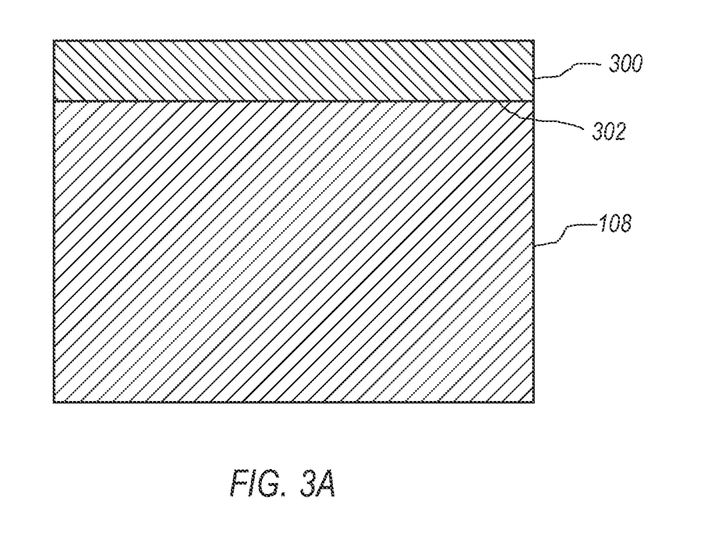
FIGS. 3A and 3B are cross-sectional views illustrating a method of fabricating a PDC according to another embodiment.
Figure 3B:
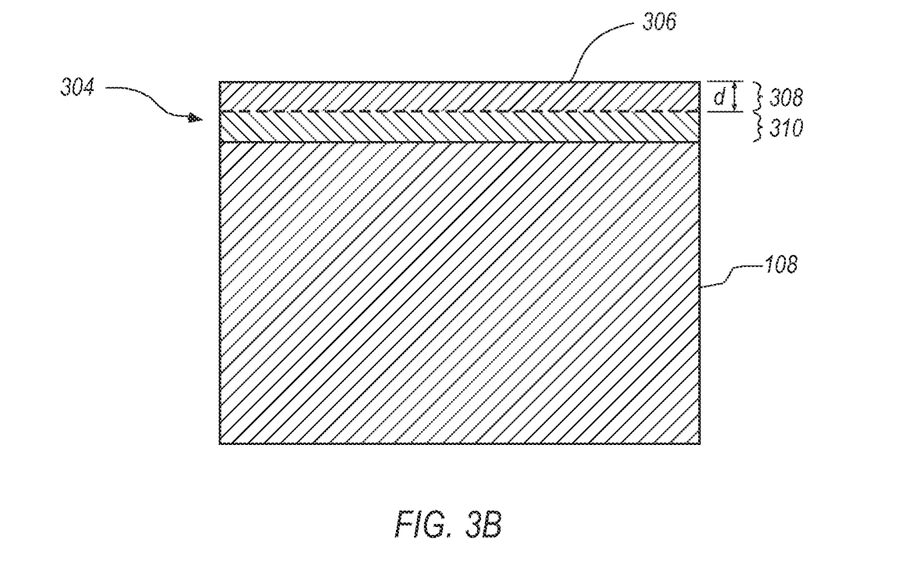

Referring to the cross-sectional views of FIGS. 3A and 3B, in another embodiment, a PDC may be fabricated, a PCD table thereof may be leached to remove catalyst therefrom, and the PCD table may be treated to remove at least some leaching by-products therefrom generated by the leaching process. Referring to FIG. 3A, at least one layer of diamond particles 300 may be positioned adjacent to a surface 302 of a substrate 108 (e.g., a cobalt cemented tungsten carbide substrate). The substrate 108 and at least one layer of diamond particles 300 may be processed under HPHT conditions to cause a catalyst (e.g., cobalt) from the substrate 108 or another source to infiltrate into the at least one layer of diamond particles 300, promote intergrowth of the diamond particles, and form the PCD table 304.

Referring to FIG. 3B, the PCD table 304 so-formed may be leached to a selected leach depth d measured from a working surface 306 using the same leaching processes described with respect to FIG. 1G. For example, a first volume 308 (i.e., a leached region) of the PCD table 304 remote from the substrate 108 may be substantially free of catalyst and a second volume 310 of the PCD table 304 proximate to the substrate 108 may be relatively unaffected by the leaching process and includes the catalyst. In an embodiment, the leach depth d that the first volume 308 extends to may be greater than about 200 μm. In another embodiment, the leach depth d may be about 50 μm to about 500 μm. In some embodiments, substantially all of the PCD table 304 may be leached so that the selected leach depth d is about equal to a thickness of the PCD table 304.

After leaching the PCD table 304, the PCD table 304 may be treated using any of the previously described cleaning processes, such as thermal or chemical cleaning, to remove some or substantially all leaching by-products therefrom from the first volume 308. It is currently believed that removing at least some of the leaching by-products from the PCD table 304 may increase the thermal stability of the PCD table 304.

Figure 4:
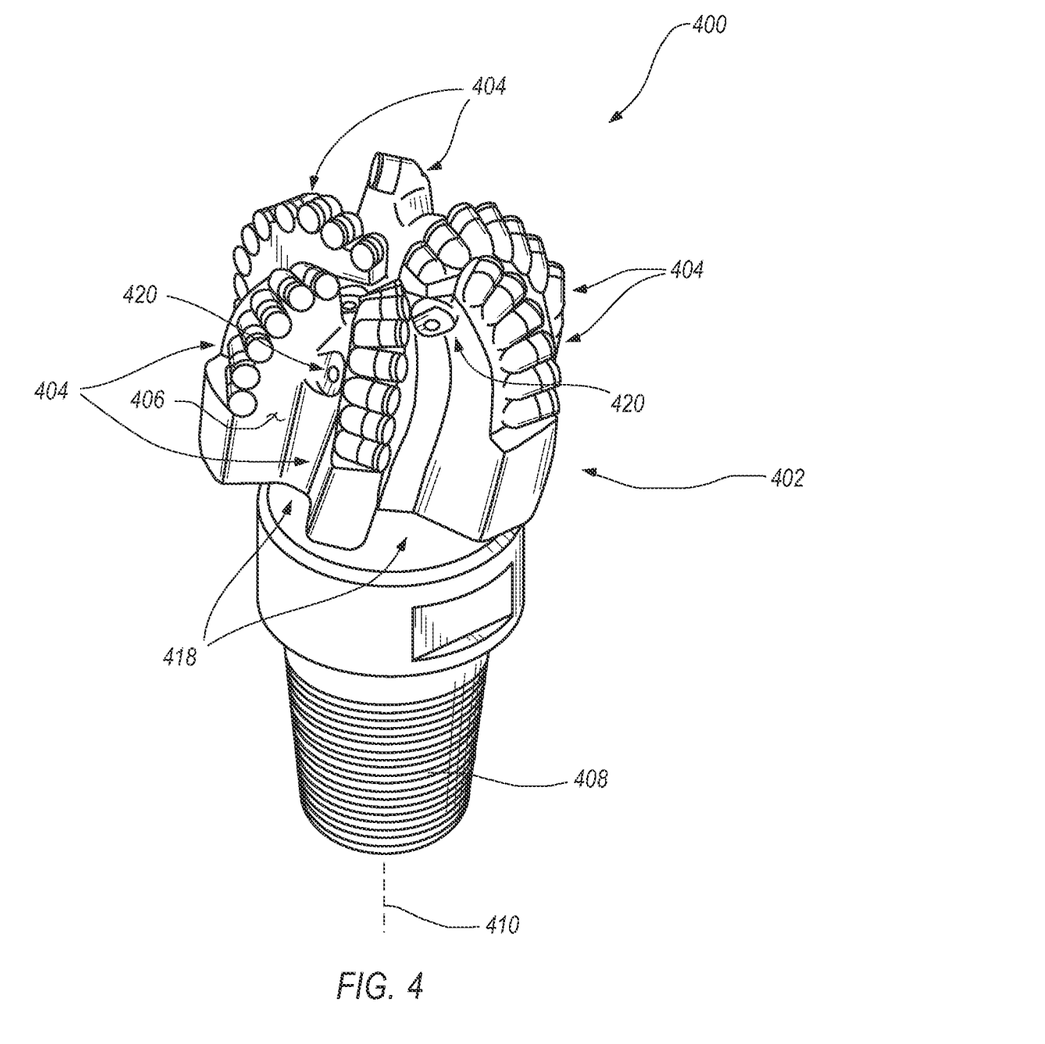
FIG. 4 is an isometric view of a rotary drill bit according to an embodiment that may employ one or more of the disclosed PDC embodiments.
Figure 5:
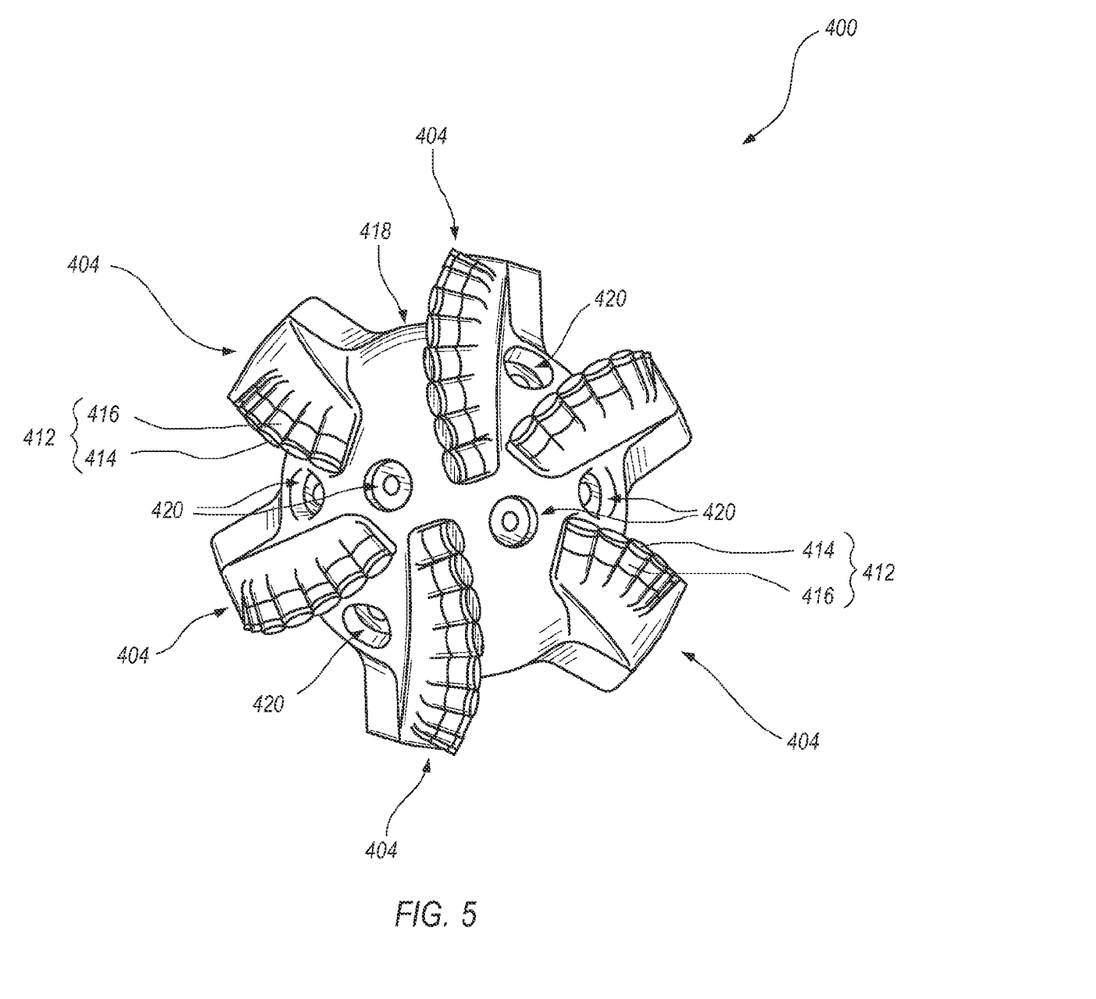
FIG. 5 is a top elevation view of the rotary drill bit shown in FIG. 4.

FIG. 4 is an isometric view and FIG. 5 is a top elevation view of a rotary drill bit 400 according to an embodiment. The rotary drill bit 400 includes at least one PDC configured according to any of the previously described PDC embodiments. The rotary drill bit 400 comprises a bit body 402 that includes radially and longitudinally extending blades 404 with leading faces 406, and a threaded pin connection 408 for connecting the bit body 402 to a drilling string. The bit body 402 defines a leading end structure configured for drilling into a subterranean formation by rotation about a longitudinal axis 410 and application of weight-on-bit. At least one PDC cutting element, configured according to any of the previously described PDC embodiments (e.g., the PDC 110 shown in FIGS. 1F and 1G), may be affixed to rotary drill bit 400 by, for example, brazing, mechanical affixing, or another suitable technique. With reference to FIG. 5, a plurality of PDCs 412 are secured to the blades 404. For example, each PDC 412 may include a PCD table 414 bonded to a substrate 416. More generally, the PDCs 412 may comprise any PDC disclosed herein, without limitation. In addition, if desired, in an embodiment, a number of the PDCs 412 may be conventional in construction. Also, circumferentially adjacent blades 404 define so-called junk slots 418 therebetween, as known in the art. Additionally, the rotary drill bit 400 includes a plurality of nozzle cavities 420 for communicating drilling fluid from the interior of the rotary drill bit 400 to the PDCs 412.

FIGS. 4 and 5 merely depict one embodiment of a rotary drill bit that employs at least one cutting element comprising a PDC fabricated and structured in accordance with the disclosed embodiments, without limitation. The rotary drill bit 400 is used to represent any number of earth-boring tools or drilling tools, including, for example, core bits, roller-cone bits, fixed-cutter bits, eccentric bits, bicenter bits, reamers, reamer wings, mining rotary drill bits, or any other downhole tool including PDCs, without limitation.

The PDCs disclosed herein may also be utilized in applications other than rotary drill bits. For example, the disclosed PDC embodiments may be used in thrust-bearing assemblies, radial bearing assemblies, wire-drawing dies, artificial joints, machining elements, and heat sinks.

Figure 6:
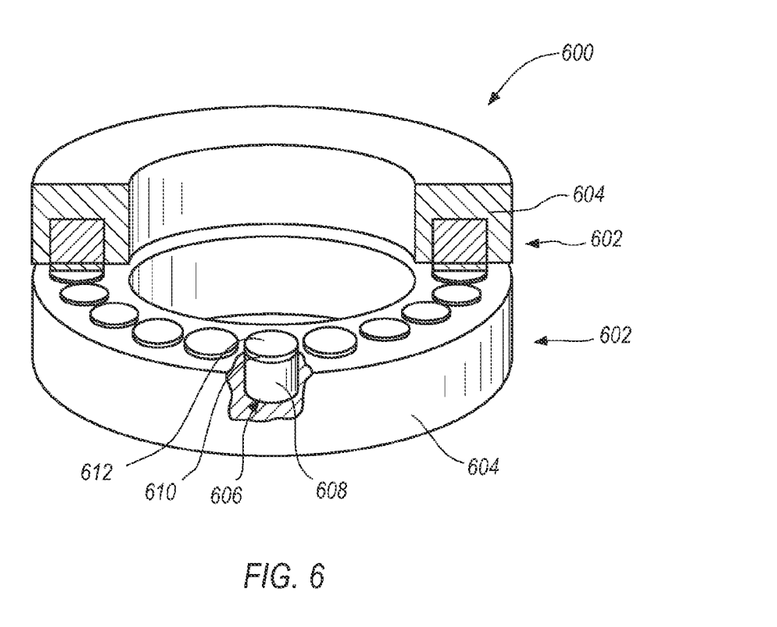
FIG. 6 is an isometric cut-away view of a thrust-bearing apparatus according to an embodiment, which may utilize any of the disclosed PDC embodiments as bearing elements.

FIG. 6 is an isometric cut-away view of a thrust-bearing apparatus 600 according to an embodiment, which may utilize any of the disclosed PDC embodiments as bearing elements. The thrust-bearing apparatus 600 includes respective thrust-bearing assemblies 602. Each thrust-bearing assembly 602 includes an annular support ring 604 that may be fabricated from a material, such as carbon steel, stainless steel, or another suitable material. Each support ring 604 includes a plurality of recesses (not labeled) that receives a corresponding bearing element 606. Each bearing element 606 may be mounted to a corresponding support ring 604 within a corresponding recess by brazing, press-fitting, using fasteners, or another suitable mounting technique. One or more, or all of bearing elements 606 may be configured according to any of the disclosed PDC embodiments. For example, each bearing element 606 may include a substrate 608 and a PCD table 610, with the PCD table 610 including a bearing surface 612.

In use, the bearing surfaces 612 of one of the thrust-bearing assemblies 602 bears against the opposing bearing surfaces 612 of the other one of the bearing assemblies 602. For example, one of the thrust-bearing assemblies 602 may be operably coupled to a shaft to rotate therewith and may be termed a "rotor." The other one of the thrust-bearing assemblies 602 may be held stationary and may be termed a "stator."

Figure 7:
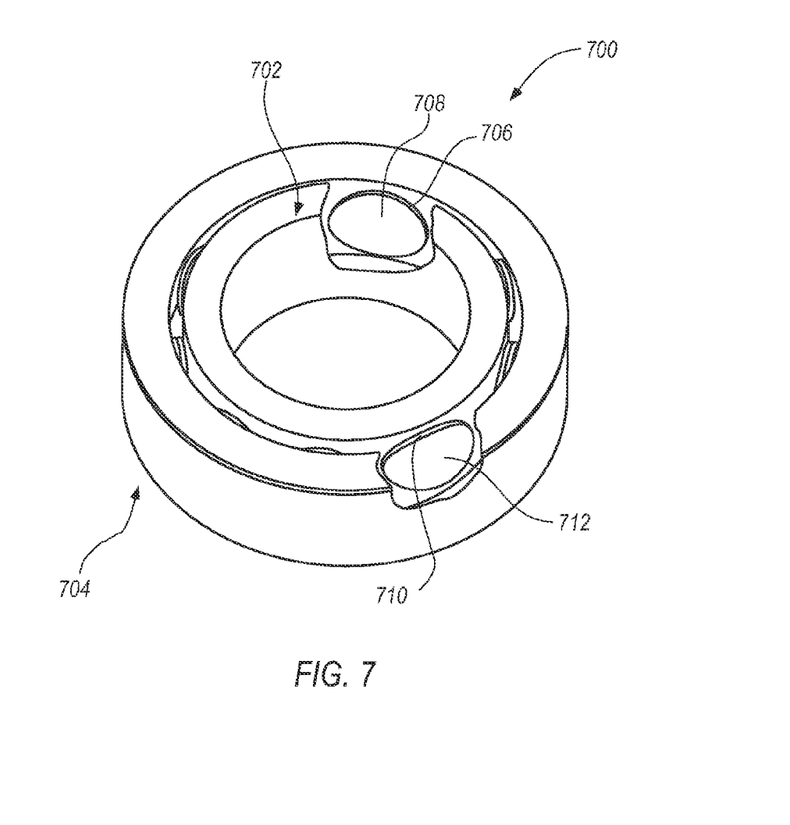
FIG. 7 is an isometric cut-away view of a radial bearing apparatus according to an embodiment, which may utilize any of the disclosed PDC embodiments as bearing elements.

FIG. 7 is an isometric cut-away view of a radial bearing apparatus 700 according to an embodiment, which may utilize any of the disclosed PDC embodiments as bearing elements. The radial bearing apparatus 700 includes an inner race 702 positioned generally within an outer race 704. The outer race 704 includes a plurality of bearing elements 706 affixed thereto that have respective bearing surfaces 708. The inner race 702 also includes a plurality of bearing elements 710 affixed thereto that have respective bearing surfaces 712. One or more, or all of the bearing elements 706 and 710 may be configured according to any of the PDC embodiments disclosed herein. The inner race 702 is positioned generally within the outer race 704, with the inner race 702 and outer race 704 configured so that the bearing surfaces 708 and 712 may at least partially contact one another and move relative to each other as the inner race 702 and outer race 704 rotate relative to each other during use.

Figure 8:
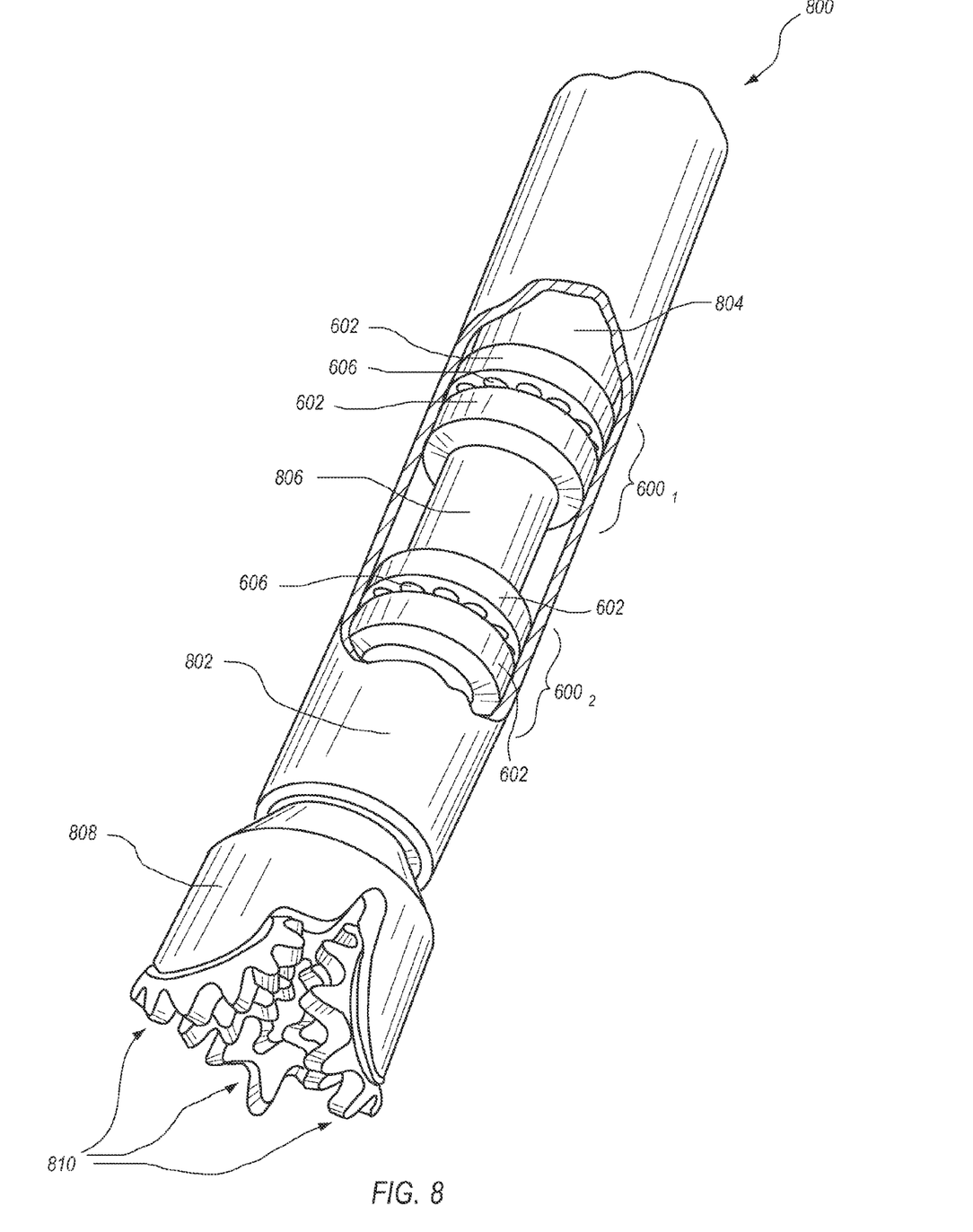
FIG. 8 is a schematic isometric cut-away view of a subterranean drilling system including at least one of the thrust-bearing apparatuses shown in FIG. 6 according to an embodiment.

Referring to FIG. 8, the thrust-bearing apparatus 600 and/or radial bearing apparatus 700 may be incorporated in a subterranean drilling system. FIG. 8 is a schematic isometric cut-away view of a subterranean drilling system 800 that includes at least one thrust-bearing apparatus 600 (FIG. 6) according to an embodiment. The subterranean drilling system 800 includes a housing 802 enclosing a downhole drilling motor 804 (i.e., a motor, turbine, or any other device capable of rotating an output shaft) that is operably connected to an output shaft 806. A first thrust-bearing apparatus $600_1$ (FIG. 6) is operably coupled to the downhole drilling motor 804. A second thrust-bearing apparatuses $600_2$ (FIG. 6) is also operably coupled to the output shaft 806. A rotary drill bit 808 configured to engage a subterranean formation and drill a borehole is connected to the output shaft 806. The rotary drill bit 808 is shown as a roller cone bit including a plurality of roller cones 810. However, other embodiments may utilize different types of rotary drill bits, such as a so-called "fixed cutter" drill bit shown in FIGS. 4 and 5. As the borehole is drilled, pipe sections may be connected to the subterranean drilling system 800 to form a drill string capable of progressively drilling the borehole to a greater depth within the earth.

One of the thrust-bearing assemblies 602 of the thrust-bearing apparatus $600_1$ is configured as a stator that does not rotate and the other one of the thrust-bearing assemblies 602 is configured as a rotor that is attached to the output shaft 806 and rotates with the output shaft 806. One of the thrust-bearing assemblies 602 of the thrust-bearing apparatus $600_2$ is configured as a stator that does not rotate and the other one of the thrust-bearing assemblies 602 is configured as a rotor that is attached to the output shaft 806 and rotates with the output shaft 806. The on-bottom thrust generated when the drill bit 808 engages the bottom of the borehole may be carried, at least in part, by the first thrust-bearing apparatus $600_1$. Fluid flow through the power section of the downhole drilling motor 804 may cause what is commonly referred to as "off-bottom thrust," which may be carried, at least in part, by the second thrust-bearing apparatus $600_2$.

In operation, drilling fluid may be circulated through the downhole drilling motor 804 to generate torque and effect rotation of the output shaft 806 and the rotary drill bit 808 attached thereto so that a borehole may be drilled. A portion of the drilling fluid may also be used to lubricate opposing bearing surfaces of the bearing elements 606 of the thrust-bearing assemblies 602.

Figure 9:
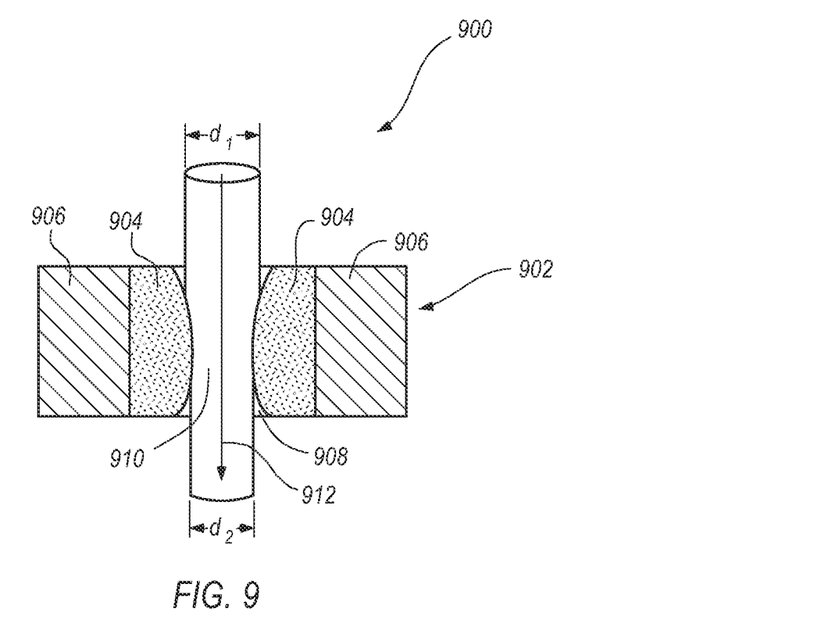
FIG. 9 is a side cross-sectional view of a wire-drawing die according to an embodiment that employs a PDC fabricated in accordance with the teachings described herein.

FIG. 9 is a side cross-sectional view of a wire-drawing die 900 according to one embodiment that employs a PDC 902 fabricated in accordance with the teachings described herein. The PDC 902 includes an inner, annular PCD region 904 comprising any of the PCD tables described herein that is bonded to an outer cylindrical substrate 906 that may be made from the same materials as the substrate 108 shown in FIGS. 1D-1G. The PCD region 904 also includes a die cavity 908 formed therethrough configured for receiving and shaping a wire being drawn. The wire-drawing die 900 may be encased in a housing (e.g., a stainless steel housing), which is not shown, to allow for easier handling. In use, a wire 910 of a diameter $d_1$ is drawn through die cavity 908 along a wire drawing axis 912 to reduce the diameter of the wire 910 to a reduced diameter $d_2$.

While various aspects and embodiments have been disclosed herein, other aspects and embodiments are contemplated. The various aspects and embodiments disclosed herein are for purposes of illustration and are not intended to be limiting. Additionally, the words "including," "having," and variants thereof (e.g., "includes" and "has") as used herein, including the claims, shall have the same meaning as the word "comprising" and variants thereof (e.g., "comprise" and "comprises") and mean "including, but not limited to."

The invention claimed is:

1. A method, comprising:
   providing an at least partially leached polycrystalline diamond table;
   subjecting the at least partially leached polycrystalline diamond table to a non-ambient pressure and an elevated temperature effective to remove at least some leaching by-products from the at least partially leached polycrystalline diamond table;
   after removing the at least some leaching by-products,
      infiltrating the at least partially leached polycrystalline diamond table with an infiltrant;
      bonding the at least partially leached polycrystalline diamond table to a substrate to form a polycrystalline diamond compact; and
      leaching a portion of the infiltrant from the infiltrated polycrystalline diamond table to which the substrate is bonded.

2. The method of claim 1 wherein the non-ambient pressure is a pressure less than ambient pressure.

3. The method of claim 1 wherein the non-ambient pressure is partial vacuum.

4. The method of claim 1 wherein the non-ambient pressure is partial vacuum and the elevated temperature is at least about 600° C. and less than about 700° C.

5. The method of claim 1 wherein subjecting the at least partially leached polycrystalline diamond table to a non-ambient pressure and an elevated temperature effective to remove at least some leaching by-products from the at least partially leached polycrystalline diamond table includes heating the at least partially leached polycrystalline diamond table under partial vacuum conditions.

6. The method of claim 5 wherein heating the at least partially leached polycrystalline diamond table under partial vacuum conditions includes heating the at least partially leached polycrystalline diamond table at a temperature sufficient to sublimate the at least some leaching by-products.

7. The method of claim 1 wherein the at least some leaching by-products include at least one of an oxide or a salt.

8. The method of claim 1, further comprising:
   reducing a non-planarity of an interfacial surface of the at least partially leached polycrystalline diamond table prior to bonding the at least partially leached polycrystalline diamond table to the substrate;
   wherein bonding the at least partially leached polycrystalline diamond table to a substrate to form a polycrystalline diamond compact includes bonding the interfacial surface of the at least partially leached polycrystalline diamond table to the substrate.

9. The method of claim 8 wherein reducing a non-planarity of the interfacial surface of the at least partially leached polycrystalline diamond table prior to bonding the at least partially leached polycrystalline diamond table to the substrate includes substantially planarizing the interfacial surface to a flatness of about 0.00050 inch to about 0.0010 inch.

10. The method of claim 8 wherein reducing a non-planarity of the interfacial surface of the at least partially leached polycrystalline diamond table prior to bonding the at least partially leached polycrystalline diamond table to the substrate occurs prior to removing the at least some leaching by-products from the at least partially leached polycrystalline diamond table.

11. The method of claim 8 wherein reducing a non-planarity of the interfacial surface of the at least partially leached polycrystalline diamond table prior to bonding the at least partially leached polycrystalline diamond table to the substrate occurs after removing the at least some leaching by-products from the at least partially leached polycrystalline diamond table.

12. The method of claim 1 wherein leaching a portion of the infiltrant from the infiltrated polycrystalline diamond table to which the substrate is bonded includes leaching the infiltrant to a selected leach depth of about 50 µm to about 500 µm.

13. The method of claim 12, further comprising removing at least some leaching by-products generated during the leaching the portion of the infiltrant.

14. The method of claim 1 wherein the acts of infiltrating and bonding are performed in a high-pressure/high-temperature process.

15. The method of claim 1 wherein the infiltrant includes at least one of iron, cobalt, or nickel.

16. The method of claim 1 wherein the substrate includes the infiltrant.

17. A method, comprising:
providing an at least partially leached polycrystalline diamond table;
subjecting the at least partially leached polycrystalline diamond table to a non-ambient pressure and an elevated temperature effective to remove at least some leaching by-products from the at least partially leached polycrystalline diamond table;
after removing the at least some leaching by-products, in a high-pressure/high-temperature process,
infiltrating the at least partially leached polycrystalline diamond table with an infiltrant from a substrate to be bonded to the at least partially leached polycrystalline diamond table; and
bonding the at least partially leached polycrystalline diamond table to the substrate to form a polycrystalline diamond compact; and
leaching a portion of the infiltrant from the infiltrated polycrystalline diamond table to a selected depth.

18. The method of claim 17 wherein the non-ambient pressure is a pressure less than ambient pressure.

19. The method of claim 17 wherein the non-ambient pressure is partial vacuum.

20. The method of claim 17 wherein the non-ambient pressure is partial vacuum and the elevated temperature is at least about 600° C. and less than about 700° C.

21. The method of claim 17, further comprising:
reducing a non-planarity of an interfacial surface of the at least partially leached polycrystalline diamond table prior to bonding the at least partially leached polycrystalline diamond table to the substrate;
wherein bonding the at least partially leached polycrystalline diamond table to the substrate to form a polycrystalline diamond compact includes bonding the interfacial surface of the at least partially leached polycrystalline diamond table to the substrate.

* * * * *